INVENTOR.
LYNDUS E. HARPER

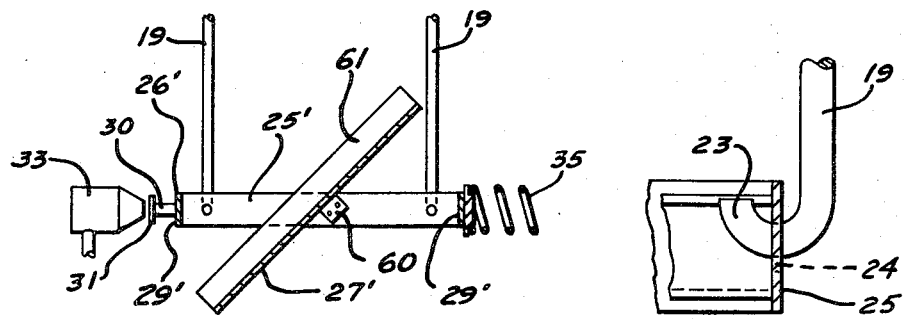
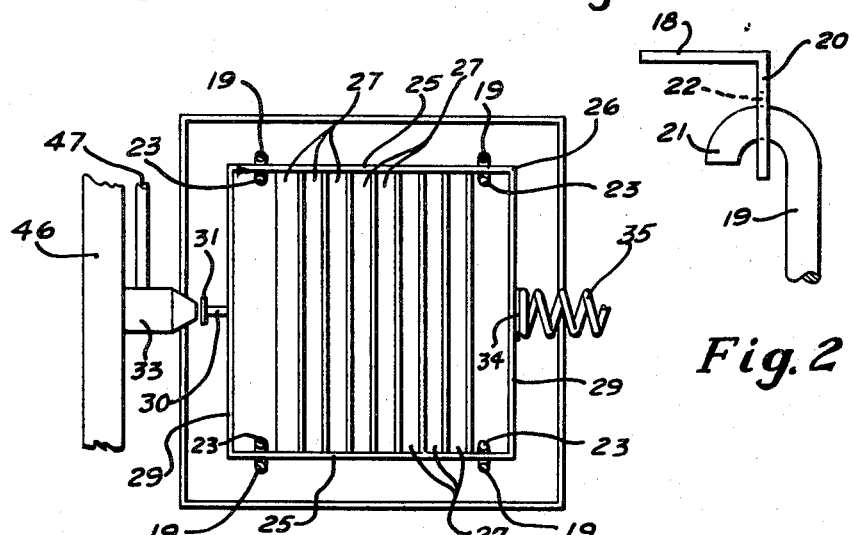
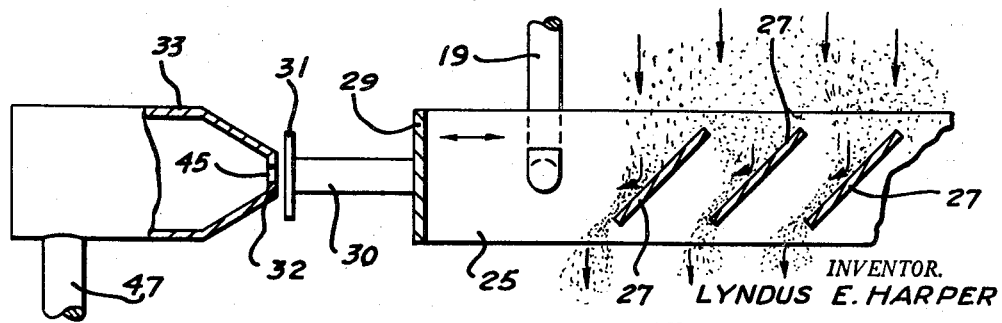

United States Patent Office 2,872,073
Patented Feb. 3, 1959

2,872,073

FEED MEASURING AND CONTROLLING APPARATUS

Lyndus E. Harper, West Barrington, R. I., assignor to B-I-F Industries, Inc., a corporation of Rhode Island Application March 26, 1956, Serial No. 573,740

19 Claims. (Cl. 222—55)

My invention relates to feed measuring and controlling apparatus, and more particularly to an apparatus for measuring and controlling the flow of a freely falling material.

It is a purpose of my invention to measure the flow of a stream of material that is discharged so as to fall by gravity from the feeding means to any suitable or desired apparatus or container by interposing in the falling stream means acted on by the stream to measure the flow thereof. The material discharged may be either a liquid or a dry material. In apparatus in which flow measuring means has been interposed in a falling stream of material, the difficulty has been encountered that the weight of the material on the member that has been placed in the stream, to be engaged thereby to obtain the measurement has been a factor in the measurement, and due to this any building up of the material on the measuring member or members, has seriously affected the accuracy of the results obtained by such an apparatus.

It is a particular purpose of my invention to avoid any inaccuracies or variations in the accuracy of the measurement of the flow of such a falling material due to the weight of the material built up on such means, as in the apparatus forming the subject matter of my invention the weight of the material that may stick to the feed measuring means has no influence on the measurement that is accomplished.

More particularly my invention comprises means for discharging a stream of material into engagement with suitable sensing means in the form of a deflecting member, or members interposed in the stream, so that all of the stream will engage the deflecting member, or members, and the particles of the stream engaging such deflecting member, or members, will have fallen through a predetermined height, which is kept constant, upon engagement with the sensing means, and thus all of the particles will be accelerated to a predetermined velocity at the time of such engagement.

My invention further comprises means for mounting said deflecting means in the stream in such a manner that the impact of the particles of the stream of material engaging the deflecting means is utilized to actuate movable means, by means of which the measurement is obtained, said mounting being of such a character that only the horizontal component of the impact of the material with the deflecting means is measured, which has a substantially constant relationship to the quantity of material engaging the deflecting means because the deflecting means is maintained at substantially the same angle to the horizontal at all times.

More specifically the sensing means comprises either a single or a plurality of inclined plates and means for suspending the plate, or plates, in the freely falling stream of material at a predetermined definite location therein relative to the point of discharge thereof so that the impact of the material thereagainst will cause only movement of said sensing means transversely of the stream, said sensing means being constrained against vertical movement by said suspending means, and any material adhering to said plate, or plates, will thus be supported solely by the pivotal mounting of said suspending means.

My invention further comprises a movable member that has a position determined by the position of the sensing means, which sensing means has a position that is determined by the horizontal component of the impact of the material against said sensing means and by yielding means opposing said horizontal movement. Preferably this is accomplished by providing resilient means, the spring pressure of which is adjustable, that engages the mounting for the deflecting plate, or plates, urging said mounting in a direction opposite to that in which the mounting is moved by the impact of the falling material against the deflecting member, or members.

While either a single plate-like member may be utilized as a deflecting member or a plurality of short sloping plates may be used, short sloping overlapping plates are preferred, as the material fall is more nearly the same distance upon engagement with the surface of the plates than where a large, relatively long, sloping plate is used. Also the material is in frictional contact with the plate for more nearly the same length of time throughout the cross section of the stream. The sloping plate, or plates, may be made of such material as stainless steel, rubber covered steel, or other materials, depending on the application and the material being measured. Under most circumstances an inelastic material or a material that has a low co-efficient of friction is desirable.

It is a further purpose of my invention to provide flow measuring means of the above mentioned character that serves to control the feed of the material into the stream so as to obtain a controlled flow thereof, and to provide air pressure actuated means for controlling said flow, which in turn is controlled by the flow measuring means forming the subject matter of my invention.

Other objects and advantages of my invention will appear as the description of the drawings proceeds. I desire to have it understood, however, that I do not intend to limit myself to the details shown or described, except as defined by the claims.

In the drawings:

Fig. 2 is an enlarged fragmentary detail elevational view of the suspending means for the sensing means, taken substantially on the line 2—2 of Fig. 1.

Fig. 3 is a similar view, partly in section and partly in elevation, taken on the line 3—3 of Fig. 1.

Fig. 4 is a view partly in transverse section and partly in plan, taken on the line 4—4 of Fig. 1, portions thereof being broken away.

Fig. 5 is a fragmentary vertical sectional view on an enlarged scale through the deflecting member, the mounting means therefor and a bleed valve associated therewith, in a different position than in Fig. 1, portions thereof being in elevation, and Fig. 6 is a fragmentary vertical sectional view of a modification.

Figure 1:
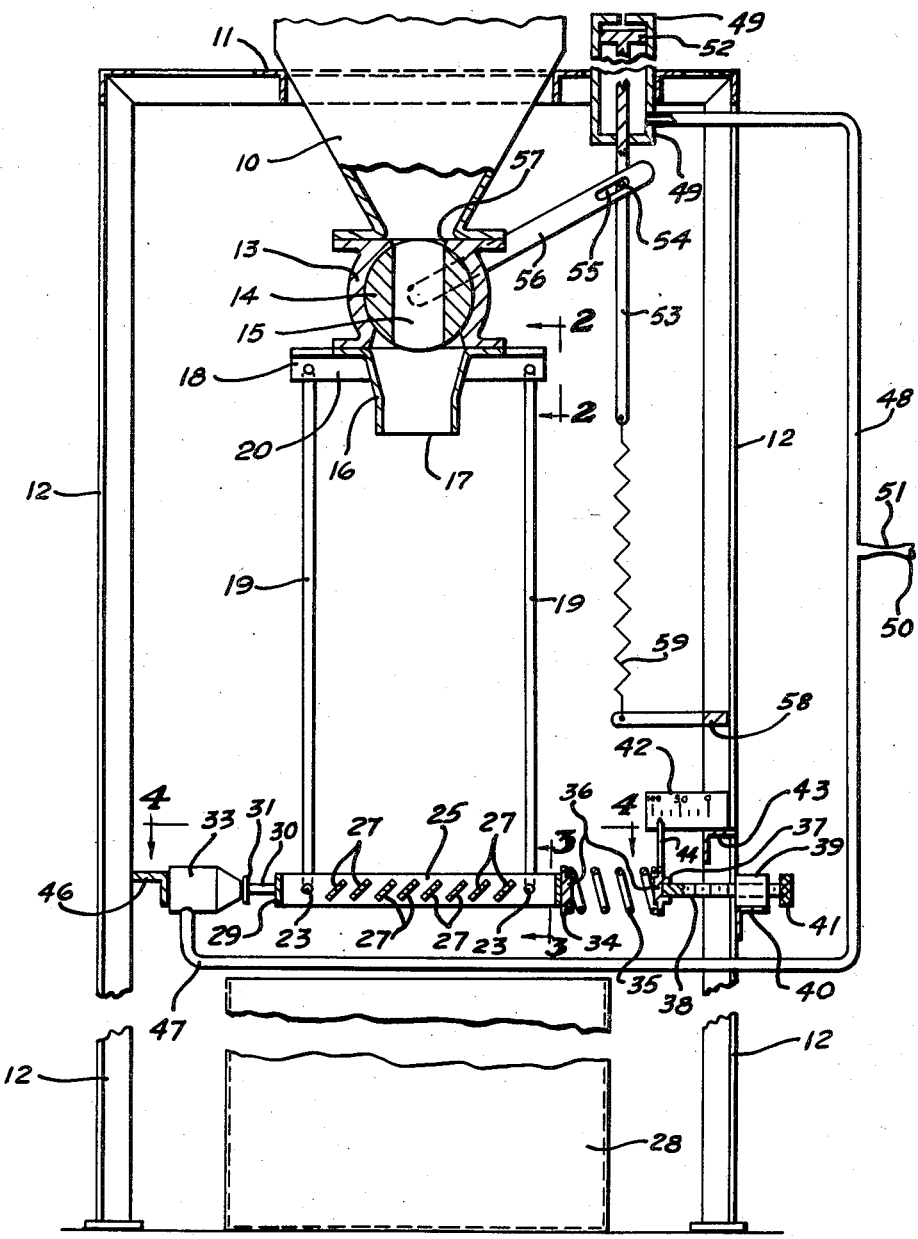
Fig. 1 is a view partly in elevation and partly in vertical section of one form of my improved flow measuring and controlling apparatus, partly broken away.

Referring in detail to the drawings, in Fig. 1 is shown a fragmentary portion of a hopper 10, which is mounted on a suitable framework 11 having vertical frame members 12, the bottom of said hopper leading to an adjustable feeding device comprising a housing 13 fixed to the lower end of the hopper 10, and a rotatable valve-like member 14 the position of which determines the rate of discharge of material through a discharge passage 15 extending through said member 14. From the housing 13 a spout 16 extends downwardly, said spout being fixed to the housing 13, the discharge end 17 of said spout thus having a position that is definitely fixed with respect to the frame 11. A pair of angle members 18 is mounted in fixed position on the housing 13.

Links 19 are mounted on suitable frictionless pivots on the depending flanges 20 of the angle members 18. As shown, four rod-like links 19 are provided (see Fig. 4) with a pair thereof suspended from each of the angle members 18. The manner of mounting the suspending rods 19 in the flanges 20 of the angle members 18 is shown in Fig. 2, said rod-like members 19 having curved upper hook ends 21 mounted in openings 22 in said flanges 20. Said suspending rods 19 are provided with upturned hook ends 23 curved similarly to the hook ends 21 and engage in openings 24 in vertically extending walls 25 of the rectangular frame 26, as shown in Figs. 3 and 4. The rectangular frame 26 is thus suspended from the fixed supports 18 for swinging movement in substantially a horizontal plane, but constrained against vertical movement by the suspending members 19.

The rectangular frame 26 has a plurality of inclined or obliquely extending plates 27 mounted between the vertically extending walls 25, said plates 27 being all mounted so that the same extend at the same angle to the vertical, and so that they are in overlapping spaced relation so that all of the material discharging from the discharge opening 17 of the spout 16 will engage an inclined surface of a plate 27 in passing from the discharge opening 17 to any suitable receptacle or container 28. The manner in which such a flowing stream of material will engage with the plates 27 is illustrated in Fig. 5. The fall of the material from the outlet or discharge opening 17 of the spout 16 to the plates 27 is a free fall and thus is the result of the action of the force of gravity on the material only, and the acceleration of a particle of material from said spout to any particular location on any of the inclined plates 27 will always be the same, and thus the velocity and the resulting impact force exerted by such a particle at any particular location on any of the plates 27 will be constant, the spacing of the plates 27 from the discharge opening 17 being always the same due to the manner of mounting thereof.

The rectangular frame has a pair of vertical walls 29, which extend at right angles to the walls 25, one of said walls 29 being provided with a stem 30 projecting from the outer face thereof and which is provided with a disk-like valve member 31 that is adapted to engage the end wall 32 of a bleed valve body 33. The other wall 29 is provided with an abutment 34 engaged by one end of a compression coil spring 35, which may fit around a boss 36 provided on the abutment 34. The other end of the compression coil spring 35 engages an adjustable abutment member 37, which may also be provided with a similar boss 36, and which is rotatably mounted on a screw-threaded stem 38, which is mounted in a suitably screw-threaded block 39 mounted on a cross member 40 provided on the frame members 12 and which may be provided with a knurled head 41 for rotating the same. The spring 35 thus may be adjusted to engage the disk-like member 31 with the end wall 32 of the bleed valve body 33 with such force as may be desired.

A suitable scale 42 may be provided on the framework by being mounted on a suitable cross member 43, and an indicator finger 44 may be provided on the movable abutment member 37 to indicate the setting thereof. Obviously the further the abutment 37 is moved to the left in Fig. 1 the greater the compression of the spring and the greater the force that will be required to unseat the valve disk 31 from the end wall 32 of the bleed valve body 33, which has the bleed valve opening 45 therein controlled by the disk-like member 31. While the valve is shown in an open position in Figs. 5 and 6, it is obvious that this is only true when material is being discharged from the discharge opening 17 into engagement with the deflecting members 27. The spacing of the disk-like member 31 from the wall 32, through which the bleed opening 45 extends, is dependent upon the horizontal component of the impact of the falling material against the plate-like members 27, as the compression of the spring 35 is acting in opposition to this force and the suspension of the plate-like members through the rectangular frame and the suspending links 19 is such that any downward vertical component of the impact of said material on the plate-like member 27 is resisted thereby and has no effect on the compression of the spring 35 by such impact of said material. Also, due to the fact that the spring 35 resists any large amplitude of movement of the rectangular frame on which the deflecting members are mounted and the fact that the end wall 32 of the bleed valve body 33 acts as means for limiting the movement of the rectangular frame in the opposite direction, the transverse movement of said frame and deflecting members from a position, in which no material is being discharged from the outlet 17, to a position in which a stream of said material is discharging therefrom, is very small.

In the embodiment of the invention illustrated the frame upon which the deflector members 27 are mounted and the members 30 and 31 constitute members that are movable in response to the horizontal component of the impact of the freely falling material against the sensing means comprising the deflector plates 27, and the movement of any one of the members 29, 30 or 31 can be utilized for measuring the amount of material that is flowing from the discharge outlet 17 and for controlling said flow of material therefrom. In the particular embodiment shown the movable member 31 is utilized for controlling the opening in a bleed valve, but obviously any other suitable adjustable means can be utilized for accomplishing the measurement and the control of the flow of the material from the discharge opening 17, as long as it is adapted to be adjusted by the movement of a member suspended like the rectangular frame member 29, or any part carried thereby to move therewith.

The bleed valve 33 is shown as being mounted on a transverse frame member 46 and as having a line 47 connected therewith that connects with the line 48 leading to a cylinder 49. The line 48 is connected with a source of constant air pressure by means of the pipe 50 that has a restricted orifice 51 therein. It will be obvious from Fig. 1 of the drawings that the pressure in the line 48 and thus in the cylinder 49 will be determined by the spacing of the disk-like member 31 from the bleed opening 45 in the valve 33. Accordingly the closer the disk-like member 31 is to the end face 32 of the valve body 33 the greater will be the pressure in the cylinder 49.

Mounted in the cylinder 49 is a suitable piston 52, which has a piston rod 53 fixed thereto that has a pin 54 projecting therefrom through a slot 55 in a lever 56, which is connected with the valve member 14 so as to move therewith, the position of the lever 56 thus determining the position of the valve 14, the opening of the valve being determined by the position of the passage 15 relative to the walls of the throat 57 leading into the valve chamber. The opposite end of the rod 54 is connected with a bracket 58 on the frame member 12 by means of a coil tension spring 59, the spring 59 thus opposing the movement of the piston 52 in an upward direction.

Accordingly, with decrease in pressure in the cylinder 49 the piston 52 will move downwardly and the valve 14 will move clockwise (in Fig. 1) toward closing position, while with an increase in pressure in the cylinder 49 the piston 52 will move upwardly and the valve 14 will move toward the wide open position thereof shown in Fig. 1. It will thus be obvious that the position of the mounting frame for the deflector members 27 determines the position of the valve 14 and thus controls the flow of material from the hopper 10 through the spout 16, and thus the flow of material downwardly from the discharge opening 17. It will also be noted that the adjustment of the flow of material can be obtained by adjusting the compression of the spring 35 by means of the adjusting member 41.

Instead of providing a plurality of relatively narrow plates 27, a single plate 27' of such area that it will intercept all of the stream flowing from the discharge outlet 17, may be provided as shown in Fig. 6, in which the plate-like member 27' is shown as being mounted by means of suitable brackets 60 on the vertical walls 25' of a frame 26' having the vertical walls 29', which walls 25' and 29' correspond to the walls 25 and 29 of the rectangular frame 26, said frame being suspended by means of the links 19 in the same manner as previously described and being engaged by a compression coil spring 35 in the same manner as previously described in order to control the movements of the bleed valve member 31 mounted thereon in the same manner as previously described, to control the discharge of air under pressure from the bleed valve 33, as described in connection with the form of the invention shown in Figs. 1 to 5 inclusive. The plate-like member 27' can be provided with side flanges 61 thereon to form a tray-like member for receiving the material discharged from the spout 16.

By my improved apparatus the principal error resulting in using an inclined plate as a means for measuring flow of material from a feeding device or controlling the rate of feed thereof is eliminated as the weight of any material adhering to the plate, or plates, is not a factor in the effect produced on the means responsive to said flow, the horizontal component of the impact of the material against the plate or plates being the principal force the horizontal component of which actuates the movable elements responsive to the flow of said material. The only other force acting on said plate, or plates, that has a horizontal component, is that resulting from the reaction to the friction of the material sliding over the plate, which is negligible.

What I claim is:

1. Means for measuring the flow of a freely falling stream of material comprising sensing means, means for mounting said sensing means in said stream in a position to be engaged by all said freely falling material, said mounting means comprising means for constraining said sensing means against vertical movement upon engagement of said material therewith and means controlling horizontal movement of said sensing means responsive to the impact of said material thereagainst, and a movable member having a position determined by the position of said sensing means responsive to said impact.

2. Means for measuring the flow of a freely falling stream of material comprising sensing means, means for mounting said sensing means in said stream in a position to be engaged by all said freely falling material, said mounting means comprising suspending means for constraining said sensing means against vertical movement upon engagement of said material therewith and yielding means opposing horizontal movement of said sensing means responsive to the impact of said material thereagainst, and a movable member having a position determined by the position of said sensing means responsive to said impact.

3. The combination with feeding means discharging a freely falling stream of material therefrom of means for measuring the flow thereof, comprising sensing means, means for mounting said sensing means in said stream in a position to be engaged by all said freely falling material, said mounting means comprising means for constraining said sensing means against vertical movement upon engagement of said material therewith and means controlling horizontal movement of said sensing means responsive to the impact of said material thereagainst, a movable member having a position determined by the position of said sensing means responsive to said impact, and feed controlling means responsive to the position of said movable member.

4. The combination with feeding means discharging a freely falling stream of material therefrom of means for measuring the flow thereof, comprising sensing means, means for mounting said sensing means in said stream in a position to be engaged by all said freely falling material, said mounting means comprising suspending means for constraining said sensing means against vertical movement upon engagement of said material therewith and yielding means opposing horizontal movement of said sensing means responsive to the impact of said material thereagainst, a movable member having a position determined by the position of said sensing means responsive to said impact and feed controlling means responsive to the position of said movable member.

5. Means for measuring the flow of a falling stream of particles accelerated to a predetermined velocity, comprising deflecting means, means suspending said deflecting means from a fixed support in said stream to be engaged by all said particles upon reaching said velocity, said suspending means constraining said deflecting means against vertical movement by engagement of said particles therewith and means for measuring the horizontal component of the impact of said stream against said deflecting means, comprising a movable member having a position determined by the horizontal component of said impact and yielding means opposing horizontal movement of said deflecting means.

6. The combination with feeding means discharging a freely falling stream of material therefrom of means for controlling the rate of said feeding means comprising means for measuring the flow thereof comprising deflecting means, means mounting said deflecting means in said stream to be engaged by all the particles thereof upon reaching a predetermined velocity, said mounting means comprising means constraining said deflecting means against vertical movement upon engagement of said material therewith, and a movable member responding to the horizontal component of the impact of said stream against said deflecting means, and feed controlling means controlled by the position of said movable member.

7. The combination with feeding means discharging a freely falling stream of material therefrom of means for controlling the rate of said feeding means comprising means for measuring the flow thereof comprising deflecting means, means suspending said deflecting means from a fixed support in said stream to be engaged by all the particles thereof upon reaching a predetermined velocity, said suspending means constraining said deflecting means against vertical movement by engagement of said particles therewith, means for measuring the horizontal component of the impact of said stream against said deflecting means including a horizontally movable member, and feed controlling means controlled by the position of said movable member.

8. The combination with feeding means discharging a freely falling stream of material therefrom of means for controlling the rate of said feeding means comprising means for measuring the flow thereof comprising deflecting means, means suspending said deflecting means from a fixed support in said stream to be engaged by all the particles thereof upon reaching a predetermined velocity, said suspending means constraining said deflecting means against vertical movement by engagement of said particles therewith, means for measuring the horizontal component of the impact of said stream against said deflecting means comprising a movable member having a position determined by the horizontal component of said impact and yielding means opposing horizontal movement of said deflecting means, and feed controlling means responsive to the position of said movable member.

9. Means for measuring the flow of a freely falling stream of material comprising sensing means comprising a plurality of spaced overlapping inclined plates, means for mounting said sensing means in said stream in a position to be engaged by all said freely falling material, said mounting means comprising means for constraining said sensing means against vertical movement upon engagement of said material therewith and means controlling horizontal movement of said sensing means responsive to the impact of said material thereagainst, and a movable member having a position determined by the position of said sensing means responsive to said impact.

10. The combination with feeding means discharging a freely falling stream of material therefrom of means for measuring the flow thereof, comprising sensing means comprising a plurality of spaced overlapping inclined plates, means for mounting said sensing means in said stream in a position to be engaged by all said freely falling material, said mounting means comprising means for constraining said sensing means against vertical movement upon engagement of said falling material therewith, a movable member having a position determined by the position of said sensing means responsive to said engagement, and feed controlling means responsive to the position of said movable member.

11. In a feeding device discharging a freely falling stream of material therefrom, air pressure actuated means for controlling the rate of feed therefrom comprising a compressed air supply, means connected with said supply for determining the air pressure supplied to said air pressure actuated means having an orifice, deflecting means mounted in said stream to be engaged by all the particles thereof upon reaching a predetermined velocity, means responding to the horizontal component of the impact of said stream against said deflecting means comprising a movable member having a position relative to said orifice determined by the horizontal component of said impact, and yielding means opposing horizontal movement of said deflecting means.

12. Means for measuring the flow of a falling stream of particles accelerated to a predetermined velocity, comprising deflecting means, means mounting said deflecting means in said stream to be engaged by all said particles upon reaching said velocity, said mounting means comprising means constraining said deflecting means against vertical movement by engagement of said particles therewith, and means for measuring the horizontal component of the impact of said stream against said deflecting means.

13. Means for measuring the flow of a falling stream of particles accelerated to a predetermined velocity, comprising deflecting means, means suspending said deflecting means from a fixed support, said deflecting means being mounted in said stream to be engaged by all said particles upon reaching said velocity, said suspending means comprising means for constraining said deflecting means against vertical movement by engagement of said particles therewith, and means for measuring the horizontal component of the impact of said stream against said deflecting means.

14. Means for measuring the flow of a freely falling stream of material comprising sensing means, means mounting said sensing means in said stream in a position to be engaged by all said freely falling material, said mounting means comprising means for constraining said sensing means against vertical movement upon engagement of said falling material therewith, and a movable member having a position determined by the position of said sensing means transversely of said stream responsive to said engagement.

15. Means for measuring the flow of a freely falling stream of material comprising inclined plate-like intercepting means, means mounting said intercepting means in a stream in a position to be engaged by all said freely falling material, said mounting means comprising means for constraining said intercepting means against vertical movement upon engagement of said material therewith, said mounting means permitting movement of said intercepting means transversely of said stream responsive to the impact of said falling material thereagainst, and a movable member having a position determined by the position of said intercepting means responsive to said engagement.

16. The combination with feeding means discharging a freely falling stream of material therefrom, comprising sensing means, means mounting said sensing means in said stream in a position to be engaged by all said freely falling material, said mounting means comprising means for constraining said sensing means against vertical movement upon engagement of said falling material therewith, a movable member having a position determined by the position of said sensing means transversely of said stream responsive to said engagement, and feed controlling means responsive to the position of said movable member.

17. The combination with feeding means discharging a freely falling stream of material therefrom, of means for measuring the flow thereof comprising inclined plate-like intercepting means, means mounting said intercepting means in said stream in a position to be engaged by all said freely falling material, said mounting means comprising means for constraining said intercepting means against vertical movement upon engagement of said material therewith, said mounting means permitting horizontal movement of said intercepting means responsive to the impact of said falling material thereagainst, a movable member having a position determined by the position of said intercepting means responsive to said impact and feed controlling means responsive to the position of said movable member.

18. Means for measuring the flow of a freely falling stream of material comprising an inclined plate, means mounting said plate in said stream in a position to be engaged by all said freely falling material, said mounting means comprising means for constraining said plate against vertical movement responsive to the engagement of said material therewith, said mounting means permitting movement of said plate transversely of said stream responsive to the engagement of said falling material therewith, and a movable member having a position determined by the position of said plate responsive to said engagement.

19. The combination with feeding means discharging a freely falling stream of material therefrom of means for measuring the flow thereof, comprising an inclined plate, means mounting said plate in said stream in a position to be engaged by all said freely falling material, said mounting means comprising means for constraining said plate against vertical movement responsive to the engagement of said material therewith, said mounting means permitting movement of said plate transversely of said stream responsive to the engagement of said falling material therewith, a movable member having a position determined by the position of said plate responsive to said engagement, and feed controlling means responsive to the position of said movable member.

References Cited in the file of this patent

UNITED STATES PATENTS

| 1,558,668 | Carter | Oct. 27, 1925 |
| 2,513,215 | Strchlow | June 27, 1950 |

FOREIGN PATENTS

| 403,936 | Great Britain | Apr. 1, 1932 |